United States Patent Office 3,651,123
Patented Mar. 21, 1972

---

3,651,123
3-ALKOXY-4-ARYLOXY-CIS-CROTONIC ACID ESTERS
Clarence L. Moyle, Clare, and Diomed M. Chern, Midland, Mich., assignors to The Dow Chemical Company, Midland, Mich.
No Drawing. Filed Apr. 29, 1968, Ser. No. 725,142
Int. Cl. C07c 69/76
U.S. Cl. 260—473 A   20 Claims

ABSTRACT OF THE DISCLOSURE

Novel 3 - loweralkoxy - 4 - aryloxy-cis-crotonic acid loweralkyl esters, prepared by reacting an aryloxide salt with a 4-halo-3-loweralkoxy-cis-crotonic acid loweralkyl ester. They are useful as plant growth inhibitors.

SUMMARY OF THE INVENTION

The present invention is directed to the 3 - alkoxy-4-aryloxy-cis-crotonic acid esters corresponding to the formula

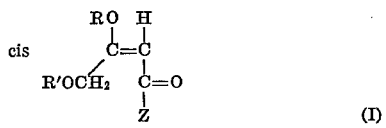

and their preparation. In the above and succeeding formulas, R represents loweralkyl, Z represents loweralkoxy, and R' represents phenyl, monophenylphenyl, monophenyl-halophenyl, monophenyl-dihalophenyl, monophenoxyphenyl, monophenoxy-halophenyl, monophenoxy dihalophenyl, monobenzylphenyl, monobenzyl-halophenyl, monobenzyl-dihalophenyl, (5–6 carbon monocycloalkyl)-phenyl, (5–6 carbon monocycloalkyl)-halophenyl, (5–6 carbon monocycloalkyl)-dihalophenyl, and substituted phenyl wherein the substituents are selected from halogen, loweralkyl, loweralkoxy and trifluoromethyl. In the present specification and claims, the terms "loweralkyl" and "loweralkoxy" are employed to represent radicals containing 1, and 2, and 3, and 4, and 5, and 6 carbon atoms, and from 1, to 2, to 3, to 4, to 5, to 6 carbon atoms, such as methyl, ethyl, propyl, isopropyl, butyl, isobutyl, sec. butyl, tert. butyl, amyl, hexyl, methoxy, ethoxy, propoxy, isopropoxy, butoxy, sec. butoxy, tert. butoxy, isobutoxy, amyloxy, and hexyloxy; and the term "halo" to represent chloro, bromo, fluoro, and iodo. Representative aryl groups include halo-loweralkylphenyl, halo-loweralkoxyphenyl, loweralkyl(loweralkoxy)phenyl, halo-cyclopentylphenyl, cyclohexyl-dihalophenyl, benzyl-dihalophenyl, phenyl-halophenyl and phenoxy-dihalophenyl such as phenyl, 2,4-dimethylphenyl,
2,4,6-trimethylphenyl,
2-methyl-4-hexylphenyl,
2-methyl-4-butoxyphenyl,
2,4,6-trimethoxyphenyl,
2,6-dichloro-4-phenylphenyl,
2-chloro-4-amyloxy-6-methylphenyl,
2-chloro-4-bromophenyl,
4-cyclopentylphenyl,
2,6-difluoro-4-cyclohexylphenyl,
4-bromo-2-trifluoromethylphenyl,
2,6-diiodophenyl,
2,4,5-tribromophenyl,
4-phenylphenyl,
2,6-dibromo-4-benzylphenyl,
2-phenoxyphenyl,
2,6-dichloro-4-phenoxyphenyl,
2-trifluoromethyl-4-methylphenyl,
2,4,5-trimethylphenyl,
2-bromo-4-phenoxyphenyl and
4-benzylphenyl.

These compounds are high boiling liquid and solid materials having a cis-structure which are soluble in many organic solvents such as acetone and benzene and slightly soluble in water. The compounds are useful as pesticides for the control of a wide variety of plant and bacterial pests.

Representative compounds of the invention are

3 - ethoxy-4-(4-phenylphenoxy)-cis-crotonic acid ethyl ester,
3-ethoxy-4-(2-chloro-4-phenylphenoxy)-cis-crotonic acid ethyl ester,
3-ethoxy-4-phenoxy-cis-crotonic acid ethyl ester,
3-ethoxy-4-(4-phenoxyphenoxy)-cis-crotonic acid ethyl ester,
3-methoxy-4-(2-iodo-4-phenoxyphenoxy)-cis-crotonic acid methyl ester,
3-hexyloxy-4-(2,4-dimethylphenoxy)-cis-crotonic acid hexyl ester,
3-methoxy-4-(4-benzylphenoxy)-cis-crotonic acid methyl ester,
3-ethoxy-4-(4-cyclopentylphenoxy)-cis-crotonic acid ethyl ester,
3-ethoxy-4-(4-bromo-2-cyclopentylphenoxy)-cis-crotonic acid ethyl ester,
3-methoxy-4-(2,6-dichloro-4-cyclopentylphenoxy)-cis-crotonic acid methyl ester,
3-methoxy-4-(2,6-dibromo-4-cyclohexylphenoxy)-cis-crotonic acid methyl ester,
3-ethoxy-4-(2-iodo-4-cyclohexylphenoxy)-cis-crotonic acid ethyl ester,
3-methoxy-4-(4-iodophenoxy)-cis-crotonic acid methyl ester,
3-ethoxy-4-(2,6-dibromophenoxy)-cis-crotonic acid ethyl ester,
3-ethoxy-4-(2,6-dibromo-4-phenylphenoxy)-cis-crotonic acid ethyl ester,
3-ethoxy-4-(2,6-dibromo-4-phenoxyphenoxy)-cis-crotonic acid ethyl ester,
3-propoxy-4-(4-iodophenoxy)-cis-crotonic acid propyl ester,
3-ethoxy-4-(2,4,5-trichlorophenoxy)-cis-crotonic acid ethyl ester,
3-methoxy-4-(2,6-diethoxyphenoxy)-cis-crotonic acid methyl ester,
3-ethoxy-4-(4-chloro-2-benzylphenoxy)-cis-crotonic acid ethyl ester,
3-methoxy-4-(2,6-difluoro-4-benzylphenoxy)-cis-crotonic acid methyl ester and
3-ethoxy-4-(4-trifluoromethylphenoxy)-cis-crotonic acid ethyl ester.

DESCRIPTION OF THE PREFERRED EMBODIMENTS

The new compounds can be prepared by reacting a phenolate alkali metal salt, R'OM, wherein M represents alkali metal, such as potassium phenate, with a 4-halo-3-alkoxy-cis-crotonic acid alkyl ester having the formula halo—$CH_2$—C(OR)=CHCOZ The reaction is carried out in a liquid reaction medium such as (1) a dialkyl ketone or mixture of dialkyl ketones, e.g., acetone and/or methyl ethyl ketone or (2) tetrahydrofuran, (3) dioxane, (4) ethylene glycol dimethyl ether or mixtures of any of the foregoing liquids. The reaction takes place at a temperature at which alkali metal halide is liberated, conveniently between 50° C. and the boiling temperature of the reaction mixture at atmospheric or substantially atmospheric pressure. The reaction temperature is controlled by regulating the rate of contacting the reactants and by the rate of heating. Since the reactants are consumed in equimolar proportions, the use of such proportions is preferred although not essential to the preparation of product, since some product forms no matter what reactant proportions are used. Upon completion of the reaction, the desired product is separated by conventional procedures.

In carrying out the invention, the reactants can be brought together in any convenient fashion. The reaction proceeds at an elevated temperature of 50° C. and above and preferably at temperatures of from 50° C. to the boiling temperature of the reaction medium. The reaction mixture is maintained in the reaction temperature range for a period of time sufficient to insure completion or substantial completion of the reaction, which can be determined by following the progressive increase in organic halide. Upon completion of the reaction, the desired product can be separated by fractional distillation and, when a solid, conveniently by filtration. The compounds are identified by carbon and hydrogen analyses, infrared (IR) and nuclear magnetic resonance (NMR) spectra.

The following examples described completely representative specific embodiments and the best modes contemplated by the inventors of carrying out their invention.

EXAMPLE 1

4-phenoxy-3-methoxy-cis-crotonic acid methyl ester

Phenol (18.8 grams, 0.2 mole), anhydrous potassium carbonate (26.2 grams, 0.19 mole) and 100 milliliters dry methyl ethyl ketone are placed in a flask, stirred and heated to boiling temperature and under reflux to form potassium phenate. 4-bromo-3-methoxy-cis-crotonic acid methyl ester (47.0 grams, 0.22 mole, B.P. 74° C. at 1.1 mm. Hg) dissolved in 100 milliliters dry methyl ethyl ketone is added dropwise thereto over a period of 3.25 hours. The mixture is then stirred and refluxed 15 hours longer. The methyl ethyl ketone solvent is removed by distillation under reduced pressure. The residue is diluted with 300 milliliters ether, then washed once with 200 milliliters cold 10 percent aqueous sodium hydroxide, once with 200 milliliters water and twice with 200 milliliters aqueous saturated sodium chloride solution. The organic layer is stripped free of ether and the residue is fractionated by distillation to yield a colorless liquid, boiling at 122–124° C. at 0.035 mm. mercury. IR and NMR spectra are in agreement with the assigned structure. The product analyzes as follows:

Found (percent): C, 64.8, 65.1; H, 6.39, 6.32. Calculated (percent): C, 65.0; H, 6.33.

EXAMPLE 2

3-alkoxy-4-aryloxy-cis-crotonic acid esters

The following compounds of the present invention are prepared using procedures as described herein.

3-ethoxy-4-phenoxy-cis-crotonic acid ethyl ester from sodium phenate and 4-bromo-3-ethoxy-cis-crotonic acid ethyl ester (boiling at 60° C./0.001 mm. Hg).

3-hexyloxy-4-(2,4 - dimethylphenoxy)-cis-crotonic acid hexyl ester from sodium 2,4-dimethylphenate and 4-bromo-3-hexyloxy-cis-crotonic acid hexyl ester (molecular weight 390.56).

3-methoxy-4-(4-benzylphenoxy)-cis-crotonic acid methyl ester from sodium 4-benzylphenate and 4-bromo-3-methoxy-cis-crotonic acid methyl ester (molecular weight 301.23).

3-ethoxy-4-(4-chloro-2-methylphenoxy) - cis - crotonic acid ethyl ester (boiling at 86°/0.000002 mm. Hg), from potassium 4-chloro-2-methylphenate and 4-bromo-3-ethoxy-cis-crotonic acid ethyl ester.

3 - methoxy-4-(p - trifluoromethylphenoxy)-cis-crotonic acid methyl ester from sodium p-trifluoromethylphenate and 4-bromo-3-methoxy-cis-crotonic acid methyl ester (molecular weight 290.3).

3-methoxy-4-(p-methoxyphenoxy) - cis - crotonic acid methyl ester from sodium p-methoxyphenate and 4-bromo - 3 - methoxy-cis-crotonic acid ethyl ester (molecular weight 252.23).

3 - ethoxy - 4 - (4 - chloro-2-cyclopentylphenoxy)-cis-crotonic acid ethyl ester (boiling at 106°/0.00002 mm. Hg) from potassium 4-chloro-2-cyclopentylphenate and 4-bromo-3-ethoxy-cis-crotonic acid ethyl ester.

3 - ethoxy - 4 - (2,6-dichloro-4-cyclohexylphenoxy)-cis-crotonic acid ethyl ester from potassium 2,6-dichloro-4-cyclohexylphenate and 4-bromo-3-ethoxy-cis-crotonic acid ethyl ester (molecular weight 401.41).

3-ethoxy-4-(2,4-dichlorophenoxy) - cis - crotonic acid ethyl ester (boiling at 80°/0.000015 mm. Hg) from sodium 2,4 - dichlorophenate and 4 - bromo-3-ethoxy-cis-crotonic acid ethyl ester.

3-ethoxy-4-(2,4,5 - trichlorophenoxy)-cis-crotonic acid ethyl ester (boiling at 96°/0.00002 mm. Hg) from potassium 2,4,5-trichlorophenate and 4-bromo-3-ethoxy-cis-crotonic acid ethyl ester.

3 - ethoxy-4-(2,6 - dibromophenoxy)-cis-crotonic acid ethyl ester (boiling at 100°/0.00003 mm. Hg) from sodium 2,6-dibromophenate and 4-bromo-3-ethoxy-cis-crotonic acid ethyl ester.

3-hexyloxy-4-(2,4-dimethoxyphenoxy)-cis-crotonic acid hexyl ester from sodium 2,4-dimethoxyphenate and 4-bromo-3-hexyloxy-cis-crotonic acid hexyl ester (molecular weight 422.56).

3-ethoxy-4-(4-chloro - 2 - benzylphenoxy)-cis-crotonic acid ethyl ester (boiling at 128°/0.00002 mm. Hg) from potassium 4 - chloro - 2 - benzylphenate and 4-bromo-3-ethoxy-cis-crotonic acid ethyl ester.

3-methoxy - 4 - (2,6-dichlorophenoxy)-cis-crotonic acid methyl ester (solid, 62–64° C. M.P.) from sodium 2,6-dichlorophenate and 4-bromo-3-methoxy-cis-crotonic acid methyl ester.

3 - ethoxy - 4 - (2,6-dichlorophenoxy) - cis-crotonic acid ethyl ester (boiling at 90°/0.000002 mm. Hg) from potassium 2,6-dichlorophenate and 4-bromo - 3 - ethoxy-cis-crotonic acid ethyl ester.

3-ethoxy - 4 - (4-chlorophenoxy)-cis-crotonic acid ethyl ester (boiling at 70°/0.00004 mm. Hg) from sodium 4-chlorophenate and 4-bromo - 3 - ethoxy-cis-crotonic acid ethyl ester.

The compounds of the present invention are useful as pesticides for the control of a wide variety of bacterial and plant pests such as Amaranthus spp., *Avena fatua, Glycine soja, Phaseolus vulgaris,* spiny clotbur, *Brassica arvensis,* barnyard grass, yellow foxtail, morning glory, milo sorghum, *Erysiphe polygoni, Venturi inaequalis,* rice blast, *Trichophyton mentagrophytes* and *Bacillus subtilis.* They are also useful as vasorelaxants and hypotensive agents in animals and as materials for studying the effects of various products upon the autonomous nervous system as well as the behavior of the animals. For such uses, the unmodified compounds can be employed. The products can also be dispersed on an inert finely divided solid and employed as dusts. Such mixtures can also be dispersed in water with or without the aid of a surface active agent and employed as sprays. In other procedures, the products can be employed as active constituents in solvent solution, aqueous dispersions or in oil-in-water and water-in-oil emulsions. Further, the compounds can be admixed with an ingestible adjuvant to prepare animal feed compositions. Good results are obtained with methods employing pesticidal and compositions containing pesticidal amounts or concentrations of the novel compounds. Preferred compositions contain from 0.0005 to 50 percent by weight of compound.

In representative operations, 3-methoxy-4-phenoxy-cis-crotonic acid methyl ester, 3-ethoxy-4-(2,4-dichlorophenoxy)-cis-crotonic acid ethyl ester and 3-ethoxy-4-(2,4,5-trichlorophenoxy)-cis-crotonic acid ethyl ester each give substantially 100 percent kills and controls of the growth of the germinant seeds and emerging seedlings of pigweed, crabgrass and soybeans, respectively, in pre-emergent operations at dosages of 10 pounds of ester compound per acre. In other operations, 3-ethoxy-4-(4-chloro-2-benzylphenoxy)-cis-crotonic acid ethyl ester and 3-methoxy - 4 - (2,6 - dichlorophenoxy) - cis - crotonic acid methyl ester give 100 percent kills of Trichophyton mentagrophytes at a concentration of 500 parts per million in nutrient agar. In further operations, 3-ethoxy-4-phenoxy-cis-crotonic acid ethyl ester and 3-ethoxy-4-(2,4,5-trichlorophenoxy)-cis-crotonic acid ethyl ester each give complete kills of yellow foxtail and pinto bean plants in post-emergent operations when employed in aqueous compositions containing the ester compound at a concentration of 10,000 parts per million. In another operation, 3-methoxy-4-phenoxy-cis-crotonic acid methyl ester gives substantial reductions in the blood pressure of rats when orally administered at dosages of 30 milligrams per kilogram of body weight.

The phenate salt reactants are prepared in known ways, conveniently by reacting phenol or a substituted phenol with an alkali metal carbonate, conveniently in the presence of a solvent, according to the following mechanism:

$$2R'OH + K_2CO_3 \rightarrow 2R'OK + H_2CO_3$$

The preparation of phenols containing substituents selected from loweralkyl, loweralkoxy, halogen, (5–6 carbon)cycloalkyl, trifluoromethyl, phenyl, phenoxy and benzyl follows established procedures.

The 4-halo-3-alkoxy-cis-crotonic acid alkyl esters are also prepared in known ways. Starting with the known 3-chloro-cis-crotonic acid lower alkyl esters (prepared by reacting, e.g., ethylacetoacetate with $PCl_5$), one makes the 3-loweralkoxy substitution by reaction with an alkali metal loweralkoxylate, e.g., according to the following mechanism:

$$CH_3C(Cl){=}CHCOOR + NaOR \rightarrow CH_3C(OR){=}CHCOOR$$

For example ethyl 3-chloro-cis-crotonate is reacted in ethanol with a substantially equimolar proportion of sodium ethoxide at 0° C. for ca. 24 hours to give product ethyl 3-ethoxy-cis-crotonate which is recovered in a conventional manner. Thereafter, the 4-halo-3-alkoxy-cis-crotonic acid ester is prepared, e.g., by bromination of the preceding compound with N-bromosuccinimide (NBS) according to the following mechanism:

$$CH_3C(OR){=}CHCOOR + NBS \rightarrow BrCH_2C(OR){=}CHCOOR + succinimide$$

For example, ethyl 3-ethoxy-cis-crotonate is reacted with an equimolar or substantially equimolar amount of NBS in carbon tetrachloride as reaction medium in the presence of a small amount of benzoyl peroxide as a promoter. The 4-bromo product is separated and recovered in conventional manner.

What is claimed is:

1. The 3-alkoxy-4-aryloxy-cis-crotonic acid lower-alkyl ester represented by the formula $$R'OCH_2{-}C(OR){=}CH{-}CO{-}Z$$

wherein R represents loweralkyl, Z represents loweralkoxy and R' represents phenyl, monophenylphenyl, monophenyl-halophenyl, monophenyl-dihalophenyl, monophenoxyphenyl, monophenoxy-halophenyl, monophenoxy-dihalophenyl, monobenzylphenyl, monobenzyl-halophenyl, monobenzyl-dihalophenyl, (5–6 carbon monocycloalkyl) phenyl, (5–6 carbon monocycloalkyl)-halophenyl, (5–6 carbon monocycloalkyl) - dihalophenyl and substituted phenyl in which the substituents are selected from fluoro, chloro, bromo, iodo, loweralkyl, loweralkoxy and trifluoromethyl.

2. The compound of claim 1 wherein R' is $C_6H_5$, R is $CH_3$ and Z is $CH_3O$.
3. The compound of claim 1 wherein R' is $C_6H_5$, R is $C_2H_5$ and Z is $C_2H_5O$.
4. The compound of claim 1 wherein R' is $4\text{-}ClC_6H_4$, R is loweralkyl, and Z is loweralkoxy.
5. The compound of claim 1 wherein R' is $4\text{-}ClC_6H_4$, R is $C_2H_5$, and Z is $C_2H_5O$.
6. The compound of claim 1 wherein R' is $4\text{-}Cl\text{-}2\text{-}CH_3C_6H_3$, R is loweralkyl, and Z is loweralkoxy.
7. The compound of claim 1 wherein R' is $4\text{-}Cl\text{-}2\text{-}CH_3C_6H_3$, R is $C_2H_5$, and Z is $C_2H_5O$.
8. The compound of claim 1 wherein R' is $4\text{-}Cl\text{-}2\text{-}C_6H_5CH_2C_6H_3$, R is loweralkyl, and Z is loweralkoxy.
9. The compound of claim 1 wherein R' is $4\text{-}Cl\text{-}2\text{-}C_6H_5CH_2C_6H_3$, R is $C_2H_5$, and Z is $C_2H_5O$.
10. The compound of claim 1 wherein R' is $4\text{-}Cl\text{-}2\text{-}C_5H_9C_6H_3$, R is loweralkyl, and Z is loweralkoxy.
11. The compound of claim 1 wherein R' is $4\text{-}Cl\text{-}2\text{-}C_5H_9C_6H_3$, R is $C_2H_5$, and Z is $C_2H_5O$.
12. The compound of claim 1 wherein R' is $2,4\text{-}Cl_2C_6H_3$, R is loweralkyl, and Z is loweralkoxy.
13. The compound of claim 1 wherein R' is $2,4\text{-}Cl_2C_6H_3$, R is $C_2H_5$, and Z is $C_2H_5O$.
14. The compound of claim 1 wherein R' is $2,4,5\text{-}Cl_3C_6H_2$, R is loweralkyl, and Z is loweralkoxy.
15. The compound of claim 1 wherein R' is $2,4,5\text{-}Cl_3C_6H_2$, R is $C_2H_5$, and Z is $C_2H_5O$.
16. The compound of claim 1 wherein R' is $2,6\text{-}Cl_2C_6H_3$, R is loweralkyl, and Z is loweralkoxy.
17. The compound of claim 1 wherein R' is $2,6\text{-}Cl_2C_6H_3$, R is $C_2H_5$, and Z is $C_2H_5O$.
18. The compound of claim 1 wherein R' is $$2,6\text{-}Cl_2C_6H_3$$

R is $CH_3$ and Z is $CH_3O$.
19. The compound of claim 1 wherein R' is $2,6\text{-}Br_2C_5H_3$, R is loweralkyl, and Z is loweralkoxy.
20. The compound of claim 1 wherein R' is $2,6\text{-}Br_2C_6H_3$, R is $C_2H_5$, and Z is $C_2H_5O$.

References Cited
UNITED STATES PATENTS 3,320,306    5/1967    Chemerda _____ 260—520

LORRAINE A. WEINBERGER, Primary Examiner

E. J. GLEIMAN, Assistant Examiner

U.S. Cl. X.R.

424—308

FORM PO-1050
(5/69)

UNITED STATES PATENT OFFICE
CERTIFICATE OF CORRECTION

Patent No. 3,651,123        Dated  21 March 1972

Inventor(s)  Clarence L. Moyle and Diomed M. Chern

It is certified that error appears in the above-identified patent and that said Letters Patent are hereby corrected as shown below:

Column 3, line 19, delete "organic" and insert --inorganic--.

Signed and sealed this 1st day of August 1972.

(SEAL)
Attest:

EDWARD M. FLETCHER, JR.
Attesting Officer

ROBERT GOTTSCHALK
Commissioner of Patents